(12) United States Patent
Peng et al.

(10) Patent No.: US 12,471,065 B2
(45) Date of Patent: Nov. 11, 2025

(54) RESOURCE SELECTION METHOD AND APPARATUS, AND USER EQUIPMENT

(71) Applicant: VIVO MOBILE COMMUNICATION CO., LTD., Dongguan (CN)

(72) Inventors: Shuyan Peng, Dongguan (CN); Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 602 days.

(21) Appl. No.: 17/953,508

(22) Filed: Sep. 27, 2022

(65) Prior Publication Data

US 2023/0015263 A1 Jan. 19, 2023

Related U.S. Application Data

(63) Continuation of application No. PCT/CN2021/087640, filed on Apr. 16, 2021.

(30) Foreign Application Priority Data

Apr. 16, 2020 (CN) .......................... 202010302326.5

(51) Int. Cl.
*H04J 1/16* (2006.01)
*H04W 72/02* (2009.01)
(Continued)

(52) U.S. Cl.
CPC ........... *H04W 72/02* (2013.01); *H04W 72/20* (2023.01); *H04W 72/56* (2023.01); *H04W 74/08* (2013.01)

(58) Field of Classification Search
CPC ..... H04W 72/02; H04W 72/20; H04W 72/56; H04W 74/08; H04W 4/40; H04W 72/542; H04W 28/26; H04W 72/566; Y02D 30/70
(Continued)

(56) References Cited

U.S. PATENT DOCUMENTS

2018/0279259 A1 9/2018 Gulati et al.
2019/0306835 A1 10/2019 Hoang et al.
(Continued)

FOREIGN PATENT DOCUMENTS

CN 109391667 A 2/2019
CN 110351858 A 10/2019
(Continued)

OTHER PUBLICATIONS

Japan Patent Office, Office Action (Decision of Rejection) issued in corresponding Application No. JP 2022-562008, dispatched Dec. 12, 2023. (Translation not available.).
(Continued)

*Primary Examiner* — Chuong T Ho
(74) *Attorney, Agent, or Firm* — Stites & Harbison, PLLC; Jeffrey A. Haeberlin (57) ABSTRACT

The embodiments of this disclosure provide a resource selection method and apparatus, and user equipment. The method includes: determining, in a case that a predetermined condition is met, a candidate resource set according to resource information of first resources in a resource selection window; and selecting a target resource from the candidate resource set, where the predetermined condition includes at least one of the following: the UE detects a reserved resource of UE of a first type, or the UE is UE of a first type; and the resource information includes at least one of the following: priority information, a measurement result, a measurement threshold, or a UE type of UE to which the first resource belongs.

19 Claims, 2 Drawing Sheets

(51) Int. Cl.
*H04W 72/20* (2023.01)
*H04W 72/56* (2023.01)
*H04W 74/08* (2009.01)

(58) Field of Classification Search
USPC ............................................ 370/236.1
See application file for complete search history.

(56) References Cited

U.S. PATENT DOCUMENTS

| | | | |
|---|---|---|---|
| 2019/0349952 A1 | 11/2019 | Uchiyama | |
| 2020/0029245 A1* | 1/2020 | Khoryaev | H04W 36/22 |
| 2020/0275411 A1* | 8/2020 | Tang | H04W 72/02 |
| 2021/0050979 A1* | 2/2021 | Hui | H04W 72/02 |
| 2022/0015071 A1* | 1/2022 | Hui | H04W 72/56 |
| 2022/0279487 A1* | 9/2022 | Ding | H04W 72/40 |
| 2022/0338255 A1* | 10/2022 | Abotabl | H04L 5/14 |
| 2022/0377748 A1* | 11/2022 | He | H04W 4/70 |
| 2023/0171799 A1* | 6/2023 | Guo | H04W 72/54 |
| | | | 370/329 |

FOREIGN PATENT DOCUMENTS

| | | |
|---|---|---|
| CN | 110521255 A | 11/2019 |
| CN | 110972102 A | 4/2020 |
| WO | 2019/031926 A1 | 2/2019 |
| WO | 2019/084927 A1 | 5/2019 |
| WO | 2019/130556 A1 | 7/2019 |
| WO | 2019/178749 A1 | 9/2019 |
| WO | 2020/063944 A1 | 4/2020 |

OTHER PUBLICATIONS

European Patent Office, Extended European Search Report issued in corresponding Application No. EP 21788508, dated Jul. 13, 2023.
China National Intellectual Property Administration, Search Report issued in corresponding Application No. 2020103023265, dated Feb. 3, 2024.
Japan Patent Office, Office Action (First Office Action) issued in corresponding Application No. JP 2022-562008, dispatched Jul. 11, 2023. (Translation not available.).
China National Intellectual Property Administration, Office Action (First Office Action) issued in corresponding Application No. 202010302326.5 dated Feb. 3, 2024. (Translation not available.).
Japan Patent Office, Grant Decision issued in corresponding Application No. JP 2022-2022-562008, dispatched May 7, 2024. (Translation not available.).
China National Intellectual Property Administration, International Search Report issued in corresponding Application No. PCT/CN2021/087640, mailed Jul. 15, 2021.
Oppo. "Discussions on resource reservation. sensing and selection in Mode 2" 3GPP TSG-RAN WGJ Meeting #98bis, RI-1910379, Oct. 20, 2019.

\* cited by examiner

RESOURCE SELECTION METHOD AND APPARATUS, AND USER EQUIPMENT

CROSS-REFERENCE TO RELATED APPLICATIONS

This disclosure is a continuation of International Application No. PCT/CN2021/087640, filed on Apr. 16, 2021, which claims priority to Chinese Patent Application No. 202010302326.5 filed on Apr. 16, 2020, which are incorporated herein by reference in their entireties.

TECHNICAL FIELD

This disclosure relates to the field of communications technologies, and in particular, to a resource selection method and apparatus, and user equipment.

BACKGROUND

At present, the new radio (New Radio, NR) sidelink (sidelink) supports the mechanism of preemption. For example, in the Mode 2 resource allocation mode, the resource preemption mechanism is supported. That is, when reserved resources of one UE overlap (for example, partially overlap) reserved resources of other UE with higher priority services, and SL-RSRP measurement values of the UE on related resources are greater than a specific associated SL-RSRP threshold, UE with lower priority services triggers resource re-selection.

In this way, after pedestrian UE (PUE) is introduced, the preemption mechanism causes a terminal device that performs resource selection to preempt resources of the PUE, thereby degrading the performance of the PUE. For example, in NR V2X, it is necessary to support communications between PUE and vehicle UE (VUE). If the PUE and the VUE use a same resource pool, and the resource pool supports the preemption mechanism, VUE preempts resources of PUE or PUE preempts resources of PUE, which degrades the performance of the PUE whose resources are preempted, and may further degrade the performance of packets sent by the PUE in the system.

SUMMARY

The embodiments of this disclosure provide a resource selection method and apparatus, and user equipment.

According to a first aspect of the present disclosure, a resource selection method is provided. The method is applied to UE, and includes: determining, in a case that a predetermined condition is met, a candidate resource set according to resource information of first resources in a resource selection window; and selecting a target resource from the candidate resource set, where the predetermined condition includes at least one of the following: the UE detects a reserved resource of UE of a first type, or the UE is UE of a first type; and the resource information includes at least one of the following: priority information, a measurement result, a measurement threshold, or a UE type of UE to which the first resources belong.

According to a second aspect of the present disclosure, a resource selection apparatus is provided, which includes: a determining module, configured to determine, in a case that a predetermined condition is met, a candidate resource set according to resource information of first resources in a resource selection window; and a selection module, configured to select a target resource from the candidate resource set determined by the determining module, where the predetermined condition includes at least one of the following: UE detects a reserved resource of UE of a first type, or the UE is the UE of the first type; and the resource information includes at least one of the following: priority information, a measurement result, a measurement threshold, or a UE type of UE to which the first resource belongs.

According to a third aspect of the present disclosure, a UE is provided, which includes a processor, a memory, and a computer program stored in the memory and executable on the processor, where the computer program, when executed by the processor, implements the steps of the resource selection method according to the first aspect.

According to a fourth aspect of the present disclosure, a computer-readable storage medium storing a computer program is provided, where the computer program, when executed by a processor, implements the steps of the resource selection method according to the first aspect.

DETAILED DESCRIPTION

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person skilled in the art based on the embodiments of this disclosure without creative efforts shall fall within the protection scope of this disclosure.

The technical terms involved in the embodiments of this disclosure are explained below.

1. Sidelink

The LTE system supports sidelink, which is used for direct data transmission between UE without using network devices, that is, data transmission is performed between UE directly over radio. The data transmission is performed in the form of broadcasting. A sidelink may also be referred to as a secondary link, a sidelink, or a sidelink. It should be noted that although sidelink can be used to support basic safety communications of vehicle to everything (vehicle to everything, V2X), but is not suitable for other more advanced V2X services.

The 5G NR (New Radio) system is to support more advanced sidelink transmission designs, such as unicast, multicast, or multicast, thereby supporting more comprehensive service types.

The design of LTE sidelink is suitable for specific public safety affairs (for example, emergency communications in disaster sites such as fire or earthquake), V2X communications, and the like. Internet of Vehicles communications include various services, such as basic safety communications, advanced (autonomous) driving, formation, and sensor expansion. LTE sidelink only supports broadcast communications, and is thus mainly used for basic safety communications. Other advanced V2X services with strict QoS requirements in terms of delay and reliability are supported by NR sidelink.

V2V communications are supported in NR V2X.

2. Sidelink Resource Allocation

The LTE sidelink design supports two resource allocation modes, namely, a scheduled resource allocation (Scheduled resource allocation) mode and an autonomous resource selection (autonomous resource selection) mode. The former is controlled by a network side device and allocates resources to each UE, and the latter is for UE to select resources autonomously. LTE sidelink mode 1 is a scheduling resource allocation mode of D2D, LTE sidelink mode 2 is an autonomous resource allocation mode of D2D, LTE sidelink mode 3 is a scheduling resource allocation mode of V2X, and LTE sidelink mode 4 is an autonomous resource allocation mode of V2X.

The basic working principle of LTE sidelink mode 4 is as follows:

Measurement is performed within a sensing window (sensing window), and scheduling assignment (scheduling assignment, SA) and interference measurement are performed within each detection TTI. Alternatively, UE performs resource selection according to the following steps:

1) Exclude resources for the UE to send data.
2) The terminal demodulates the received SA, obtains reserved resources of other UE, and excludes the reserved resources of other UE.
3) Perform energy detection within the sensing window, measure reference signal strength indication (reference signal strength indication, RSSI), and exclude resources with large interference according to a measurement result.
4) Within the sensing window, randomly select a subframe (subframe) from the 20% of the resources with the least interference for periodic resource reservation.

In addition, NR V2X defines two resource allocation modes, one of which is a mode 1 in which resources are scheduled for a base station; and the other of which is a mode 2 in which the UE decides what resources to use for transmission. In this case, the resource information may come from a broadcast message of the base station or pre-configured information. If the UE works within the range of the base station and has an RRC connection with the base station, the UE may work in the mode 1 and/or the mode 2. If the UE works within the range of the base station but has no radio resource control (Radio Resource Control, RRC) connection with the base station, the UE can only work in the mode 2. If the UE is outside the range of the base station, the UE can only work in the mode 2 and perform V2X transmission according to the pre-configured information.

The basic working principle of the mode 2 in NR V2X is as follows:

1) After a resource selection process is triggered, TX UE first determines a resource selection window (a lower boundary of the resource selection window is at time of T1 after the resource selection process is triggered, an upper boundary of the resource selection window is at time of T2 after the resource selection process is triggered, T2 is a value selected by the UE within a data delay (packet delay budget, PDB) of TB transmission thereof, and T2 is not earlier than T1).
2) Before resource selection, the UE needs to determine a candidate resource set for resource selection, and compare a measured RSRP corresponding to a resource in the resource selection window with a corresponding RSRP threshold (that is, an RSRP threshold). If the RSRP is higher than the RSRP threshold, the resource is considered to be excluded. That is, if the RSRP is lower than the RSRP threshold, the resource can be included in the candidate resource set. The measured RSRP corresponding to the resource in the resource selection window is a value measured by the UE in a slot where SCI information of the resource is scheduled, and may be, for example, a value obtained by measuring SCI (or a physical sidelink control channel (Physical Sidelink Control Channel, PSCCH)), or measuring a physical sidelink share channel (Physical Sidelink Share Channel, PSSCH) scheduled in a slot where the SCI is located.
3) After the candidate resource set is determined, the UE randomly selects resources in the candidate resource set.

In addition, the UE may reserve transmission resources for the next transmission during the current transmission. In addition, NR V2X supports chained resource reservation, that is, a piece of sidelink control information (Sidelink Control Information, SCI) can reserve the current resources, and can reserve up to two additional resources. In the next resource, two more reserved resources may be indicated. In the resource selection window, resources can be further continuously reserved through dynamic reservation.

3. Partial Sensing (Partial Sensing)

The partial sensing in LTE V2X is mainly designed to save power and support P2V communications. PUE supports two modes of resource selection. One mode is random resource selection; and the other mode is to perform partial sensing first, select resources based on a result of partial sensing, and perform semi-static resource reservation. Which mode the PUE selects is configured by the RRC, and when the RRC is configured to support resource selection of two modes, the PUE decides which resource selection mode to use.

Figure 1:
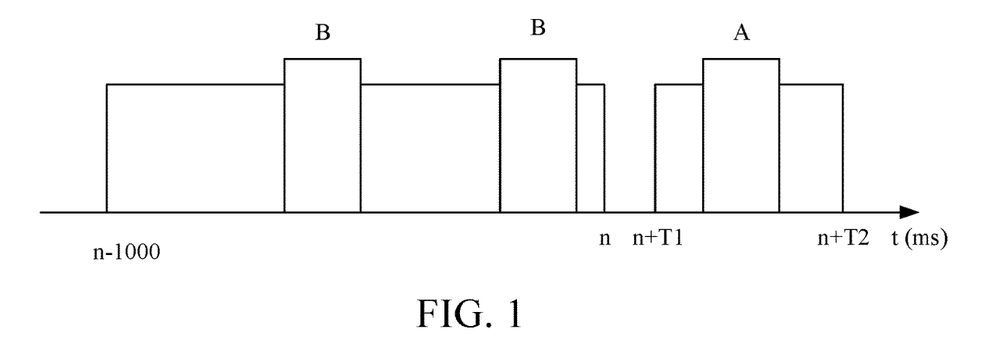
FIG. 1 is a schematic diagram of a PUE resource detection window according to an embodiment of this disclosure.

Alternatively, the manners of performing partial sensing and resource detection by the terminal are as follows:

As shown in FIG. 1, a PUE detection window is a window in a range of [n−1000, n]. A window A in [n+T1, n+T2] in a selection window is a selection window of PUE configured by a higher layer. The PUE detects SCI sent by other terminals in a detection window B. According to the detected SCI and a reservation period, the resource reservation of other terminals in the window A is inferred. The PUE may exclude resources that do not meet the conditions in the selection window according to such information. At least 20% of the remaining resources (20% of the window length) are selected as a candidate resource set and reported to the MAC layer. The MAC layer randomly selects a resource from the candidate resource set as a candidate resource for the PUE. The PUE performs periodic reservation for the selected resource, and the reservation period is indicated in the SCI.

4. Sidelink Preemption (Pre-Emption) Mechanism

In Mode 2, the resource pre-emption mechanism is supported. When reserved resources of one UE overlap partially overlap) reserved resources of other UE with higher priority services, and SL-RSRP measurement values of the UE on related resources are greater than a specific associated SL-RSRP threshold, UE with lower priority services triggers resource re-selection. The associated SL-RSRP threshold may be a predefined or fixed RSRP threshold pre-configured by the base station. The fixed value may be determined based on a mapping relationship between information such as priority, PDB, service type, QoS, or reliability of a to-be-transmitted service (that is, the current TB) of the UE and the SL-RSRP threshold. A threshold X is determined.

5. Other Terms

It should be noted that, "I" herein means "or". For example, AB may represent A or B. "And/or" used herein describes only an association relationship for describing associated objects and represents that three relationships may exist. For example, A and/or B may represent the following three cases: Only A exists, both A and B exist, and only B exists.

It should be noted that, for ease of describing the technical solutions in the embodiments of this disclosure clearly, in the embodiments of this disclosure, terms such as "first" and "second" are used to distinguish same or similar items with a basically same function and role. A person of ordinary skill in the art can understand that the terms such as "first" and "second" do not define the amount and the operating sequence. For example, a first preset rule and a second preset rule are used to distinguish different preset rules, rather than used to describe a specific order of the preset rules.

It should be noted that, in the embodiments of this disclosure, the terms, such as "exemplarily" and "for example", are used to represent giving an example, an illustration or a description. Any embodiment or design scheme described by using "exemplarily" or "for example" in the embodiments of this disclosure should not be explained as being more preferred or having more advantages than another embodiment or design scheme. Exactly, use of the term, such as "exemplarily" or "for example", is intended to present a related concept in a specific manner.

It should be noted that, in the embodiments of this disclosure, "of (English: of)", "relevant (English: corresponding, relevant)" and "corresponding (English: corresponding)" may be mixed during use sometimes. It should be noted that when a difference thereof is de-emphasized, meanings expressed by them are the same. In the embodiments of this disclosure, "plurality" means two or more.

The resource selection method provided in the embodiments of this disclosure may be executed by a resource selection apparatus, or a terminal device. The resource selection apparatus may be a terminal device or may be a functional module and/or a function entity that can implement the resource selection method in the terminal device, which may be determined according to an actual use requirement and is not limited in the embodiments of the present invention.

The resource selection method provided in the embodiments of this disclosure is applicable to a resource selection scenario in which PUE with the Mode 2 mechanism is introduced, is also applicable to a scenario in which the PUE selects resources for transmission, for example, a P2V scenario or a P2P scenario, is also applicable to a scenario in which resources reserved by the PUE are detected and how other terminals (for example, PUE or VUE) select resources, and is also applicable to a resource selection scenario of a selection mechanism in a resource pool that supports P2V or a resource pool that supports V2P.

The technical solutions provided in this disclosure may be applied to various communications systems, such as a 5G communications system, a future evolved system, or a plurality of communications fusion systems. The technical solutions may include a plurality of application scenarios, such as machine to machine (Machine to Machine, M2M), D2M, macro-micro communications, enhanced mobile broadband (enhance Mobile Broadband, eMBB), ultra-reliable and low latency communications (ultra Reliable & Low Latency Communication, uRLLC), and massive machine type communication (Massive Machine Type Communication, mMTC). These scenarios include but are not limited to a scenario in which a terminal device communicates with a terminal device, a network device communicates with a network device, or a network device communicates with a terminal device. The embodiments of this disclosure may be applied to communications between a network device and a terminal device in a 5G communications system, communications between a terminal device and a terminal device, or communications between a network device and a network device.

Figure 2:
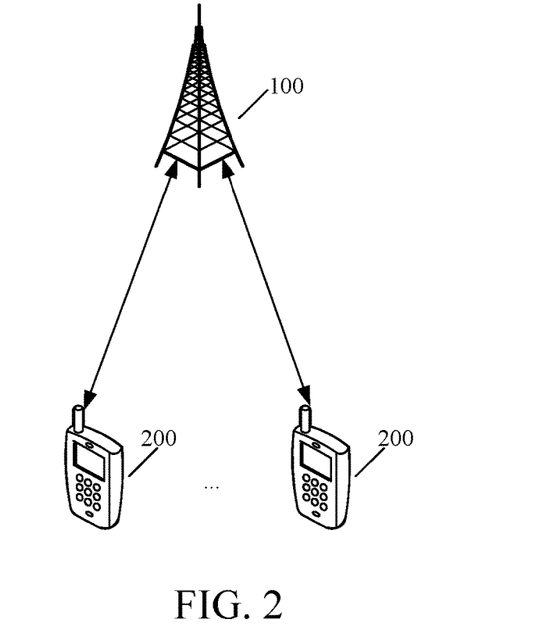
FIG. 2 is a possible schematic structural diagram of a communications system according to an embodiment of this disclosure.

FIG. 2 is a possible schematic structural diagram of a communications system according to an embodiment of this disclosure. As shown in FIG. 2, the communications system includes at least one network device 100 (only one network device is shown FIG. 2) and one or more UE 200 connected to each network device 100.

The network device 100 may be a base station, a core network device, a transmission and reception point (Transmission and Reception Point, TRP), a relay node, an access point, or the like. The network device 100 may be a base transceiver station (base transceiver station, BTS) in a global system for mobile communications (global system for mobile communication, GSM) or a code division multiple access (code division multiple access, CDMA) network, or may be an NB (NodeB) in wideband code division multiple access (wideband code division multiple access, WCDMA), or may be an eNB or an eNodeB (evolutional NodeB) in LTE. Alternatively, the network device 100 may further be a radio controller in a cloud radio access network (CRAN) scenario. Alternatively, the network device 100 may be a network device in a 5G communications system or a network device in a future evolved network. However, these terms do not constitute a limitation on this disclosure.

The UE 200 may be a terminal device. The terminal may be a wireless terminal device or may be a wired terminal device. The wireless terminal device may be a device that provides voice and/or other service data connectivity to a user, a handheld device with a wireless communications function, a computing device, another processing device connected to a wireless modem, an in-vehicle device, a wearable device, a terminal device in a future 5G network, or a terminal device, a roadside unit, or a relay node in a future evolved PLMN network. The wireless terminal device may communicate with one or more core networks by using a radio access network (Radio Access Network, RAN). The wireless terminal device may be a mobile terminal device, such as a mobile phone (or referred to as a "cellular" phone) and a computer with a mobile terminal device. For example, the wireless terminal device may be a portable, pocket-sized, handheld, computer-built-in or in-vehicle mobile apparatus, which exchanges voice and/or data with a wireless access network. The wireless terminal device may be a personal communication service (Personal Communication Service, PCS) phone, a cordless phone, a session initiation protocol (Session Initiation Protocol, SIP) phone, a wireless local loop (Wireless Local Loop, WLL) station, or a personal digital assistant (Personal Digital Assistant, PDA) device. The wireless terminal device may alternatively be a mobile device, a user equipment (User Equipment, UE), a UE terminal device, an access terminal device, a wireless communications device, a terminal device unit, a terminal device station, a mobile station (Mobile Station), a mobile console (Mobile), a remote station (Remote Station), a remote station, a remote terminal device (Remote Terminal), a subscriber unit (Subscriber Unit), a subscriber station (Subscriber Station), a user agent (User Agent), a terminal device apparatus, or the like. In an example, in this embodiment of this disclosure, FIG. 2 shows an example in which the terminal device is a mobile phone.

The resource selection method provided in the embodiments of the present invention is exemplarily described below by using UE as an example.

Figure 3:
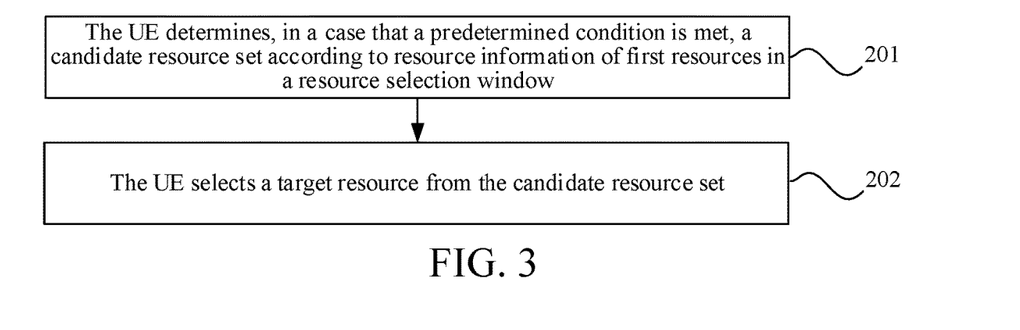
FIG. 3 is a schematic flowchart of a resource selection method according to an embodiment of this disclosure.

FIG. 3 is a schematic flowchart of a resource selection method according to an embodiment of this disclosure. As shown in FIG. 3, the resource selection method may include step 201 and step 202.

Step 201: The UE determines, in a case that a predetermined condition is met, a candidate resource set according to resource information of first resources in a resource selection window.

Step 202: The UE selects a target resource from the candidate resource set.

The predetermined condition includes at least one of the following: UE detects a reserved resource of UE of a first type, or the UE is the UE of the first type; and the resource information includes at least one of the following: priority information, a measurement result, a measurement threshold, or a UE type of UE to which the first resources belong.

In this embodiment of this disclosure, in a case that the UE detects the reserved resource of the UE of the first type, the first resource includes the reserved resource of the UE of the first type.

It may be understood that, the predetermined condition may include at least one of the following: the UE detects the reserved resource of the UE of the first type, or the partial sensing mechanism of the UE is enabled.

In this embodiment of this disclosure, when the partial sensing mechanism of the UE is enabled, it indicates that the UE is the UE of the first type. When the UE is the UE of the first type (which may be alternatively understood as when the partial sensing mechanism is enabled), that is, when the UE of the first type executes the resource selection scheme, the first resources may include the reserved resource of the UE of the first type, or may not include the reserved resource of the UE of the first type, which is not limited in this embodiment of this disclosure.

In this embodiment of this disclosure, the measurement result may include a measurement value. For example, the measurement value corresponding to the first resources may include a reference signal received power (Reference Signal Received Power, RSRP), received signal strength indicator (Received Signal Strength Indicator, RSSI), reference signal received quality (Reference Signal Received Quality, RSRQ), a signal-to-noise and interference ratio (Signal-to-noise and Interference Ratio, SINR), a signal noise ratio (Signal noise ratio, SNR), and a block error ratio (Block Error ratio, BLER).

Optionally, the UE of the first type in this embodiment of this disclosure may be PUE, and UE of a second type may be VUE.

Optionally, the first resources may be resources indicated in SCI or DCI, may be indicated periodic resources, or may be indicated aperiodic resources, which is not limited in this embodiment of this disclosure.

Optionally, in this embodiment of this disclosure, the resource information further includes enable information, and the enable information is used for indicating whether a partial sensing mechanism of the UE is enabled.

Optionally, in this embodiment of this disclosure, in a case that the resource information includes the UE type of the UE to which the first resources belong, the UE may exclude a reserved resource of a target UE type based on the resource information and a predetermined exclusion rule. The predetermined exclusion rule includes excluding the reserved resource of the target UE type; and the target UE type may be the first type (for example, PUE).

Optionally, in this embodiment of this disclosure, before obtaining the resource information of the first resources in the resource selection window, the UE receives SCI corresponding to at least one first UE in the resource detection window. SCI corresponding to each first UE carries priority information; the first resources include a reserved resource of each of the at least one first UE in the resource selection window. It may be understood that the priority information includes priority information carried in the SCI corresponding to each of the at least one first UE.

It should be noted that, the reserved resource of the UE in this embodiment of this disclosure may be understood as a resource reserved by the UE, or may be understood as a resource occupied by the UE, which is not limited in the embodiments of this disclosure. For example, a reserved resource of PUE may be referred to as a resource occupied by the PUE. Similarly, a reserved resource of VUE may be referred to as a resource occupied by the VUE.

The UE in this embodiment of this disclosure may determine candidate resources through at least three implementations.

The first possible implementation (increase the priority of the UE of the first type)

Alternatively, in this embodiment of this disclosure, the priority of the UE of the first type may be improved, so that when the UE performs resource exclusion, the reserved resource of the UE of the first type may be considered as an occupied resource, and then the reserved resource of the UE of the first type may be preferentially excluded, to reduce the probability that the reserved resource of the UE of the first type is preempted.

Optionally, in this embodiment of this disclosure, the priority information is used for indicating that: the UE of the first type has a highest priority, and/or the reserved resource of the UE of the first type has a highest priority.

For example, in a case that the UE is the UE of the first type, the priority information is used for indicating that the UE has the highest priority. In this way, other UE cannot occupy the reserved resource of the UE of the first type.

For example, when the VUE preempts resources, if the reserved resource of the PUE is detected, the VUE considers that the reserved resource cannot be occupied (that is, the reserved resource of the PUE is excluded). Certainly, it may also be considered that the resource occupied by the PUE is excluded.

Optionally, in this embodiment of this disclosure, a priority of the UE of the first type is set according to a first preset rule, where the first preset rule includes at least one of the following:

setting the priority of the UE of the first type to be greater than or equal to a priority of a packet transmitted by the UE, setting the priority of the UE of the first type according to a preset priority offset value, or the priority of the UE of the first type being within a preset priority range.

For example, the UE may set or obtain the priority of the UE of the first type in at least one of the following manners:

1. Define a priority offset value of the UE of the first type.
2. Define a value range of the priority of the UE of the first type.

For example, the priority of the UE of the first type may be a priority of the reserved resource of the UE of the first type, or a priority of a packet transmitted by the UE of the first type. In an example, a priority of the reserved resource of the PUE may be set such that the priority of the reserved resource of the PUE is higher than those of other transmitted packets, or such that the priority of the reserved resource of the PUE is in a higher priority range (for example, the priority of the PUE needs to be less than a predetermined priority).

It should be noted that, the first preset rule is applicable to: all resource pools configured with P2V or V2P, or resource pools configured with the first preset rule (for example, if the first preset rule is configured in a specific resource pool, it is considered that this resource pool needs to use this rule).

Further, whether to use the first preset rule to map the priority of the UE of the first type in a specific resource pool may be indicated explicitly (for example, 1 bit indicates whether the first preset rule is used in this resource pool, and if 1 bit is 1, it indicates that the priority of the resource pool needs to be set according to this rule; and if 1 bit is 0, it indicates that the priority of the resource pool needs to be set according to other rules rather than using this rule), or may be implicitly indicated.

Further, optionally, in this embodiment of this disclosure, the preset priority offset value is related to a channel busy ratio (channel busy ratio, CBR) (for example, the range of CBR) of the UE; or the preset priority offset value is predefined, or configured by higher layer signaling, or indicated by downlink control information (Downlink Control Information, DCI), or indicated by sidelink control information SCI; or a lower threshold of the preset priority range is predefined, or configured by higher layer signaling, or indicated by DCI, or indicated by SCI.

For the foregoing scenario in which the first preset rule includes setting the priority of the UE of the first type according to a preset priority offset value:

Example 1: RRC may configure a corresponding P_delta value (that is, the foregoing preset priority offset value) for each CBR range. When the CBR is greater than the CBR threshold, P_delta is 0; otherwise, P_delta adopts the configured value. The CBR threshold is a value predefined in a protocol/configured by a network/pre-configured.

Example 2: The UE may obtain P_pri according to a priority rule of the UE of the second type, and the priority of the UE of the first type is P_pri+P_delta. The priority rule of the UE of the second type may include: obtaining a priority from SCI, or obtaining a priority from high-layer signaling.

The second possible implementation (preferentially exclude the reserved resource of the UE of the first type)

Optionally, in this embodiment of this disclosure, the first resources include the reserved resource of the UE of the first type and a reserved resource of UE of a second type. The foregoing step 201 may include the following step 201a:

Step 201a: The UE excludes the reserved resource of the UE of the first type in a case that the priority of the reserved resource of the UE of the first type is the same as a priority of the reserved resource of the UE of the second type.

For example, when the UE detects the reserved resource of the PUE and the reserved resource of the VUE, if the reserved resource of the PUE and the reserved resource of the VUE have the same priority, the reserved resource of the PUE is preferentially excluded.

For example, assuming that the priority of the PUE is configured as the highest priority, the priority of the VUE may be set to be lower than the priority of the PUE, or may be configured as the highest priority. For example, the priority is 0-7 from high to low, and the priority of the VUE may be set in 0-7. If the priority of the PUE and the priority of the VUE are both set to 0, the reserved resource of the PUE can be directly excluded.

For example, the UE may perform exclusion for the first time by taking priority as first-level classification, and then perform exclusion again in priorities of the same class by taking UE type as second-level classification.

For example, taking VUE as an example, the VUE performs resource exclusion based on priority, and then performs resource exclusion based on UE type. That is, the VUE may preempt a reserved resource of VUE in the resource pool. If a quantity of resources does not meet the requirements, a reserved resource of PUE is preempted. Alternatively, resource preemption may be performed according to priorities of PUE.

Optionally, in this embodiment of this disclosure, step 201 may include the following steps:

Step A1: If it is detected that a reference measurement value corresponding to any first resource is greater than or equal to a target measurement threshold, the UE excludes the any resource.

For example, taking the measurement value being an RSRP as an example, when the UE measures the RSRP of the PUE and/or the PUE measures the RSRP, the following manner is used. For example, the result of the RSRP of the PUE measured by the UE is RSRP_real. When resource exclusion is performed, the probability that the resource occupied by the PUE is selected by the UE can be reduced by increasing a reference RSRP measurement value of the reserved resource of the PUE. For example, the improved reference RSRP measurement value (for example, RSRP_real+RSRP_delta) is compared to an RSRP threshold. The RSRP_delta is a value predefined/pre-configured/configured in a protocol, or the value of RSRP_delta is related to the CBR.

Optionally, in this embodiment of this disclosure, in a case that the measurement result includes a reference measurement value, the resource selection method provided in the embodiments of this disclosure may further include the following step:

Step A2: The UE configures a detection parameter of the UE of the first type.

The detection parameter includes at least one of the following: a second preset rule of a target measurement threshold, a third preset rule of a reference measurement value, a measurement threshold offset value, or a measurement offset value.

For example, in this embodiment of this disclosure, the reserved resource of the UE of the first type may be preferentially excluded by defining or configuring a relationship between the priority of the UE and the target measurement threshold. For example, the measurement threshold is increased, and an increase amount is beta threshold. For example, the measurement value is increased, and the increase amount is beta. The beta value and the beta threshold may be predefined in a protocol, or pre-configured by the RRC, or configured by the RRC/MAC CE, or indicated by DCI/SCI.

In an example, taking the measurement value being an RSRP as an example, if the RSRP threshold is RSRP_th according to the mapping rule between the priority and the RSRP threshold defined in the first protocol version (for example, R16), when the UE performs resource exclusion, whether the resource of the UE of the first type is excluded may be determined based on the RSRP threshold RSRP_th-beta.

Further, optionally, in this embodiment of this disclosure, in a case that any first resource is the reserved resource of the UE of the first type, the second preset rule includes: setting the target measurement threshold based on a first original measurement threshold and a first measurement threshold offset value; or in a case that the UE is the UE of the first type, the second preset rule includes: setting the target measurement threshold based on a second original measurement threshold and a second measurement threshold offset value. It should be noted that, the first measurement threshold offset value and the second measurement threshold offset value may be positive values or negative values, which are not limited in the embodiments of this disclosure.

For example, the setting the target measurement threshold based on a first original measurement threshold and a first measurement threshold offset value may include: subtracting or adding the first measurement threshold offset value based on the first original measurement threshold, to obtain the target measurement threshold.

For example, the setting the target measurement threshold based on a second original measurement threshold and a second measurement threshold offset value may include: subtracting or adding the second measurement threshold offset value based on the second original measurement threshold, to obtain the target measurement threshold.

For example, the original measurement thresholds are determined by searching a table corresponding to the RRC based on the priority of the UE and a priority parameter of the priority corresponding to the reserved resource. For example, the first original measurement threshold is obtained by looking up a table based on the priority of the UE and the priority corresponding to the reserved resource of the UE of the first type.

For example, when the UE performs resource exclusion, the used RSRP threshold (that is, the target measurement threshold) may be obtained according to at least one of the following manners. Manner 1: When the occupied resource of the UE of the first type is measured, it is considered that the value of the RSRP threshold is a value obtained by subtracting the first measurement threshold offset value from the obtained RSRP threshold (that is, the original measurement threshold). Manner 2: When the UE of the first type performs measurement, it is considered that the value of the RSRP threshold is a value obtained by adding the second measurement threshold offset value to the obtained RSRP threshold (that is, the original measurement threshold).

For example, the first measurement threshold offset value is predefined, or specified in a protocol, or pre-configured, or configured by a first carrier, or indicated by first indication information; and/or the first measurement threshold offset value is related to a CBR of the UE, where the first carrier includes RRC or a MAC CE; and the first indication information includes DCI or SCI.

For example, the second measurement threshold offset value is predefined, or specified in a protocol, or pre-configured, or configured by a second carrier, or indicated by second indication information; and/or the second measurement threshold offset value is related to a CBR of the UE, where the second carrier includes RRC or a MAC CE; and the second indication information includes DCI or SCI.

Further, optionally, in this embodiment of this disclosure, in a case that any first resource is the reserved resource of the UE of the first type, the third preset rule includes: obtaining a reference measurement value corresponding to the reserved resource of the UE of the first type based on a measurement value corresponding to the reserved resource of the UE of the first type and a first measurement offset value; or in a case that the UE is the UE of the first type, the third preset rule includes: obtaining, based on a measurement value corresponding to any first resource and a second measurement offset value, a reference measurement value corresponding to the any first resource. It should be noted that, the first measurement offset value and the second measurement offset value may be positive values or negative values, which are not limited in the embodiments of this disclosure.

For example, the obtaining a reference measurement value corresponding to the reserved resource of the UE of the first type based on a measurement value corresponding to the reserved resource of the UE of the first type and a first measurement offset value may include: subtracting or adding the first measurement offset value based on the measurement value corresponding to the reserved resource of the UE of the first type, to obtain the reference measurement value corresponding to the reserved resource of the UE of the first type.

For example, the obtaining, based on a measurement value corresponding to any first resource and a second measurement offset value, a reference measurement value corresponding to the any first resource may include: subtracting or adding the second measurement offset value based on the measurement value corresponding to the any first resource, to obtain the reference measurement value corresponding to the any first resource.

For example, taking the measurement value being an RSRP as an example, when the occupied resource of the UE of the first type is measured, it is considered that a reference value of the RSRP is the measured RSRP plus an offset value; or when the UE of the first type performs measurement, it is considered that the reference value of the RSRP is the measured RSRP minus the offset value.

For example, the first measurement offset value is predefined, or specified in a protocol, or pre-configured, or configured by a third carrier, or indicated by third indication information; and/or the first measurement offset value is related to a CBR of the UE, where the third carrier includes RRC or a MAC CE; and the third indication information includes DCI or SCI.

For example, the second measurement offset value is predefined, or specified in a protocol, or pre-configured, or configured by a fourth carrier, or indicated by fourth indication information; and/or the second measurement offset value is related to a CBR of the UE, where the fourth carrier includes RRC or a MAC CE; and the fourth indication information includes DCI or SCI.

In an example, when the UE performs resource detection, if it is detected that a resource corresponding to received SCI in the resource selection window is a reserved resource of PUE, RSRP beta is accumulated on the measured result of RSRP_real of the RSRP, as a reference RSRP measurement value (that is, the RSRP measurement value is RSRP_real+RSRP beta) corresponding to the PUE. In addition, the UE obtains RSRP_th (measurement threshold) according to the priorities of the VUE and the PUE, the priority configured by the corresponding RRC, and the table of the RSRP threshold, and compares the sizes of RSRP_real+RSRP beta and RSRP_th. If RSRP_real+RSRP beta is greater than or equal to RSRP_th, the reserved resource of the PUE is excluded; otherwise, the reserved resource of the PUE is considered to be an available resource at the current moment.

It should be noted that, the first preset rule, the second preset rule, and the third preset rule in this embodiment of this disclosure may be predefined, configured, or pre-configured, or may be configured on the network side, which are not limited in the embodiments of this disclosure.

The third possible implementation (preferentially select resources not occupied by the UE of the first type)

Optionally, in this embodiment of this disclosure, the first resources include the reserved resource of the UE of the first type and resources not occupied by the UE of the first type. The foregoing step 201 may include the following step 201*b*:

Step 201*b*: The UE selects, according to the resource information, all or some of the resources not occupied by the UE of the first type as candidate resources.

For example, the resources not occupied by the UE of the first type include a reserved resource of UE of a second type.

For example, during the resource selection process by the UE, if there are resources occupied by the UE of the first type and resources occupied by the UE of the second type in the candidate resource set, the resources occupied by the UE of the second type are preferentially selected.

For example, the resource information further includes information used for indicating that a first probability is lower than a second probability; and the first probability is a probability that the UE selects the reserved resource of the UE of the first type, and the second probability is a probability that the UE selects the reserved resource of the UE of the second type.

For example, a difference between the first probability and the second probability is greater than or equal to a first threshold, where the first threshold is specified in a protocol, or configured by a control node, or pre-configured.

Optionally, in this embodiment of this disclosure, in a case that the UE is the UE of the first type, the reporting condition of the candidate resource set is that a ratio of a resource quantity of the candidate resource set to a resource quantity of the resource selection window is greater than or equal to a second threshold.

For example, when the RSRP of the PUE is measured, the reporting condition is that a ratio of a resource quantity of the candidate resource set to a resource quantity of the resource selection window is greater than or equal to X % (the second threshold). The value of X % is less than a value defined in the first protocol version (for example, R16). In the related art, X % defined in R16 is 20%.

For example, the resource selection method provided in the embodiments of the present invention may further include the following step:

Step A3: If the candidate resource set meets a predetermined reporting condition, the candidate resource set is reported.

For example, if the UE of the first type performs resource selection, a reporting threshold of a candidate resource set of the UE of the first type may be defined. When the candidate resource set meets the reporting threshold, the selection process of the candidate resource set is ended; otherwise, the reporting threshold is increased, and resource selection is performed again until a selected candidate resource set meets the reporting threshold.

It should be noted that, the reporting condition may be predefined, may be specified in a protocol, may be configured on the network side, or may be pre-configured, which is not limited in the embodiments of this disclosure.

Optionally, in this embodiment of this disclosure, the resource selection method provided in the embodiments of this disclosure may further include the following step:

Step A4: The UE receives target signaling.

The target signaling includes downlink control information DCI, or sidelink control information SCI, or high-level configuration signaling; and the target signaling is used for indicating that the UE is the UE of the first type or the first resources include the reserved resource of the UE of the first type. It may be understood that, the target signaling is used for marking the UE of the first type or marking the reserved resource of the UE of the first type.

For example, the target signaling is further used for indicating whether the UE is the UE of the first type or whether the first resources include the reserved resource of the UE of the first type.

For example, when the UE receives special SCI, it may be considered that the SCI is SCI sent by the UE of the first type. The special SCI may be SCI including a special code point.

For example, indication information carried in DCI or SCI received by the UE in the resource detection window may be used for indicating whether the corresponding UE is the UE of the first type, or whether the reserved resource of the corresponding UE is a resource reserved by the UE of the first type. Further, the foregoing DCI or SCI may be indicated explicitly, for example, the DCI or the SCI carries indication information of 1 bit. The foregoing DCI or SCI may be indicated implicitly, for example, predefined code points in the DCI or the SCI are represented as scheduling information of the UE of the first type.

It should be noted that, the target signaling may be configured by the network side for the UE.

Optionally, in this embodiment of this disclosure, step 201 may include the following step 201*c*:

Step 201*c*: The UE determines the candidate resource set according to target information and the resource information of the first resources in the resource selection window.

The target information is used for indicating that the UE performs resource selection and/or enabling, or whether the UE supports a preemption mechanism; and the target information is carried in at least one of the following: RRC, DCI, SCI, or configuration information of a resource pool.

It should be noted that, the target information may be configured by the network side for the UE.

For example, the foregoing UE enabling refers to that the UE enables the preemption mechanism.

For example, the UE may determine whether to execute the resource selection scheme for resource selection provided in this disclosure according to whether the resource pool enables the preemption mechanism, and/or whether the UE of the first type enables the preemption mechanism, and/or whether the UE of the first type supports the preemption mechanism.

In an example, the RRC pre-configures or the RRC or the MAC CE configures whether the resource of the UE of the first type can be preempted.

In another example, the DCI or the SCI may be used for indicating whether the preemption mechanism is supported/enabled. Further, the foregoing DCI or SCI may be indicated explicitly, for example, the DCI or the SCI carries indication information of 1 bit. The foregoing DCI or SCI may be indicated implicitly, for example, one or more predefined code points in the DCI or the SCI indicate that the resource can be preempted, and/or one or more predefined code points indicate that the resource cannot be preempted.

For example, the target information may be configuration information, and the configuration information may be a parameter of a resource pool, or the UE, or the priority, or BWP, or carrier configuration, or QoS.

According to the resource selection method provided in the embodiments of this disclosure, in a case that the UE detects the reserved resource of the UE of the first type and/or the UE is the UE of the first type, the candidate resource set is determined according to the resource information (at least one of the priority information, the measurement result, or the measurement threshold) of the first resources in the resource selection window, and the target resource is selected from the candidate resource set. In this way, when the UE of the first type supports the preemption mechanism or the UE of the first type detects preemption, resource selection or re-selection may be performed based on the resource information of the first resources in the resource selection window, which reduces the probability that the resources of the UE of the first type are preempted, and avoids frequent resource re-selection by the UE of the first type, thereby reducing the energy overhead and performance loss of the UE of the first type, and further achieving power saving.

Figure 4:
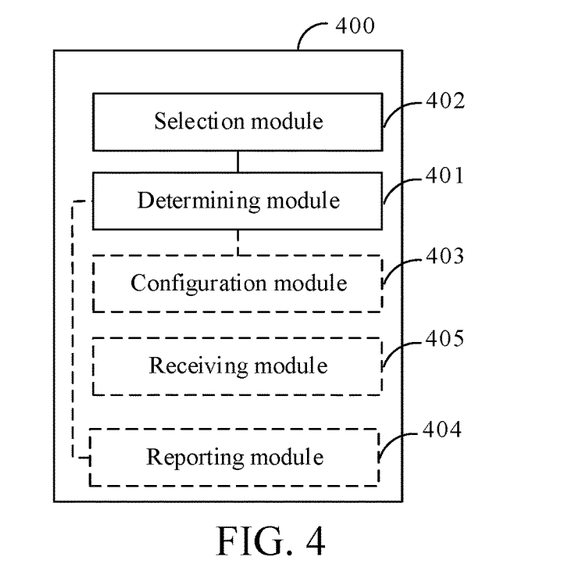
FIG. 4 is a schematic structural diagram of a resource selection apparatus according to an embodiment of this disclosure.

FIG. 4 is a possible schematic structural diagram of a resource selection apparatus according to an embodiment of this disclosure. As shown in FIG. 4, the resource selection apparatus 400 includes: a determining module 401 and a selection module 402, where the determining module 401 is configured to determine, in a case that a predetermined condition is met, a candidate resource set according to resource information of first resources in a resource selection window; and the selection module 402 is configured to select a target resource from the candidate resource set determined by the determining module 401, where the predetermined condition includes at least one of the following: the UE detects a reserved resource of UE of a first type, or the UE is UE of a first type; and the resource information includes at least one of the following: priority information, a measurement result, a measurement threshold, or a UE type of UE to which the first resources belong.

Optionally, in a case that the UE detects the reserved resource of the UE of the first type, the first resources include the reserved resource of the UE of the first type.

Optionally, the resource information further includes enable information, and the enable information is used for indicating whether a partial sensing mechanism of the UE is enabled.

Optionally, in a case that the UE is the UE of the first type, the priority information is used for indicating that the UE has the highest priority.

Optionally, a priority of the UE of the first type is set according to a first preset rule, where the first preset rule includes at least one of the following: setting the priority of the UE of the first type to be greater than or equal to a priority of a packet transmitted by the UE, setting the priority of the UE of the first type according to a preset priority offset value, or the priority of the UE of the first type being within a preset priority range.

Optionally, the preset priority offset value is related to a CBR of the UE; or the preset priority offset value is predefined, or configured by higher layer signaling, or indicated by DCI, or indicated by SCI; or a lower threshold of the preset priority range is predefined, or configured by higher layer signaling, or indicated by DCI, or indicated by SCI.

Optionally, the priority information is used for indicating that the reserved resource of the UE of the first type has a highest priority.

Optionally, the first resources include the reserved resource of the UE of the first type and a reserved resource of UE of a second type; and the determining module 401 is further configured to exclude the reserved resource of the UE of the first type in a case that the priority of the reserved resource of the UE of the first type is the same as a priority of the reserved resource of the UE of the second type.

Optionally, the first resources include the reserved resource of the UE of the first type and resources not occupied by the UE of the first type; and the determining module 401 is further configured to select, according to the resource information, all or some of the resources not occupied by the UE of the first type as candidate resources.

Optionally, the resources not occupied by the UE of the first type include a reserved resource of UE of a second type; and the resource information is further used for indicating that a first probability that the UE selects the reserved resource of the UE of the first type is lower than a second probability that the UE selects the reserved resource of the UE of the second type.

Optionally, a difference between the first probability and the second probability is greater than or equal to a first threshold, where the first threshold is specified in a protocol, or configured by a control node, or pre-configured.

Optionally, the measurement result includes a reference measurement value. As shown in FIG. 4, the resource selection apparatus 400 further includes: a configuration module 403, where the configuration module 403 is configured to configure a detection parameter of the UE of the first type, where the detection parameter includes at least one of the following: a second preset rule of a target measurement threshold, a third preset rule of a reference measurement value, a measurement threshold offset value, or a measurement offset value.

Optionally, in a case that any first resource is the reserved resource of the UE of the first type, the second preset rule includes: obtaining the target measurement threshold based on a first original measurement threshold and a first measurement threshold offset value; or in a case that the UE is the UE of the first type, the second preset rule includes: setting the target measurement threshold based on a second original measurement threshold and a second measurement threshold offset value.

Optionally, in a case that any first resource is the reserved resource of the UE of the first type, the third preset rule includes: obtaining a reference measurement value corresponding to the reserved resource of the UE of the first type based on a measurement value corresponding to the reserved resource of the UE of the first type and a first measurement offset value; or in a case that the UE is the UE of the first type, the third preset rule includes: obtaining, based on a measurement value corresponding to any first resource and a second measurement offset value, a reference measurement value corresponding to the any first resource.

Optionally, the first measurement threshold offset value is predefined, or specified in a protocol, or pre-configured, or configured by a first carrier, or indicated by first indication information; and/or the first measurement threshold offset value is related to a CBR of the UE, where the first carrier includes RRC or a MAC CE; and the first indication information includes DCI or SCI.

Optionally, the second measurement threshold offset value is predefined, or specified in a protocol, or pre-configured, or configured by a second carrier, or indicated by second indication information; and/or the second measurement threshold offset value is related to a CBR of the UE, where the second carrier includes RRC or a MAC CE; and the second indication information includes DCI or SCI.

Optionally, the first measurement offset value is predefined, or specified in a protocol, or pre-configured, or configured by a third carrier, or indicated by third indication information; and/or the first measurement offset value is related to a channel busy rate CBR of the UE, where the third carrier includes RRC or a MAC CE; and the third indication information includes DCI or SCI.

Optionally, the second measurement offset value is predefined, or specified in a protocol, or pre-configured, or configured by a fourth carrier, or indicated by fourth indication information; and/or the second measurement offset value is related to a channel busy rate CBR of the UE, where the fourth carrier includes RRC or a MAC CE; and the fourth indication information includes DCI or SCI.

Optionally, in a case that the UE is the UE of the first type, the apparatus further includes a reporting module 404. The reporting module 404 is further configured to report the candidate resource set in a case that a reporting condition is met, where the reporting condition is that a ratio of a resource quantity of the candidate resource set to a resource quantity of the resource selection window is greater than or equal to a second threshold.

Optionally, as shown in FIG. 4, the resource selection apparatus 400 further includes a receiving module 405. The receiving module 405 is configured to receive target signaling, where the target signaling includes DCI, or SCI, or high-level configuration signaling; and the target signaling is used for indicating that the UE is the UE of the first type or the first resources include the reserved resource of the UE of the first type.

Optionally, the determining module 401 is further configured to determine the candidate resource set according to target information and the resource information of the first resources in the resource selection window, where the target information is used for indicating that the UE performs resource selection and/or enabling, or whether the UE supports a preemption mechanism; and the target information is carried in at least one of the following: RRC, DCI, SCI, or configuration information of a resource pool.

According to the resource selection apparatus provided in the embodiments of this disclosure, in a case that the UE detects the reserved resource of the UE of the first type and/or the UE is the UE of the first type, the resource selection apparatus may determine the candidate resource set according to the resource information (at least one of the priority information, the measurement result, or the measurement threshold) of the first resources in the resource selection window, and select the target resource from the candidate resource set. In this way, when the UE of the first type supports the preemption mechanism or the UE of the first type detects preemption, resource selection or re-selection may be performed based on the resource information of the first resources in the resource selection window, which reduces the probability that the resources of the UE of the first type are preempted, and avoids frequent resource re-selection by the UE of the first type, thereby reducing the energy overhead and performance loss of the UE of the first type, and further achieving power saving.

The resource selection apparatus provided in the embodiments of this disclosure can implement the process shown in the foregoing method embodiments. To avoid repetition, details are not described herein again.

It should be noted that, as shown in FIG. 4, the modules that are necessarily included in the resource selection apparatus 400 are indicated by solid line boxes, such as the determining module 401 and the selection module 402; and the modules that are alternatively included in the resource selection apparatus 400 are indicated by dashed boxes, such as the configuration module 403, the reporting module 404, and the receiving module 405.

Figure 5:
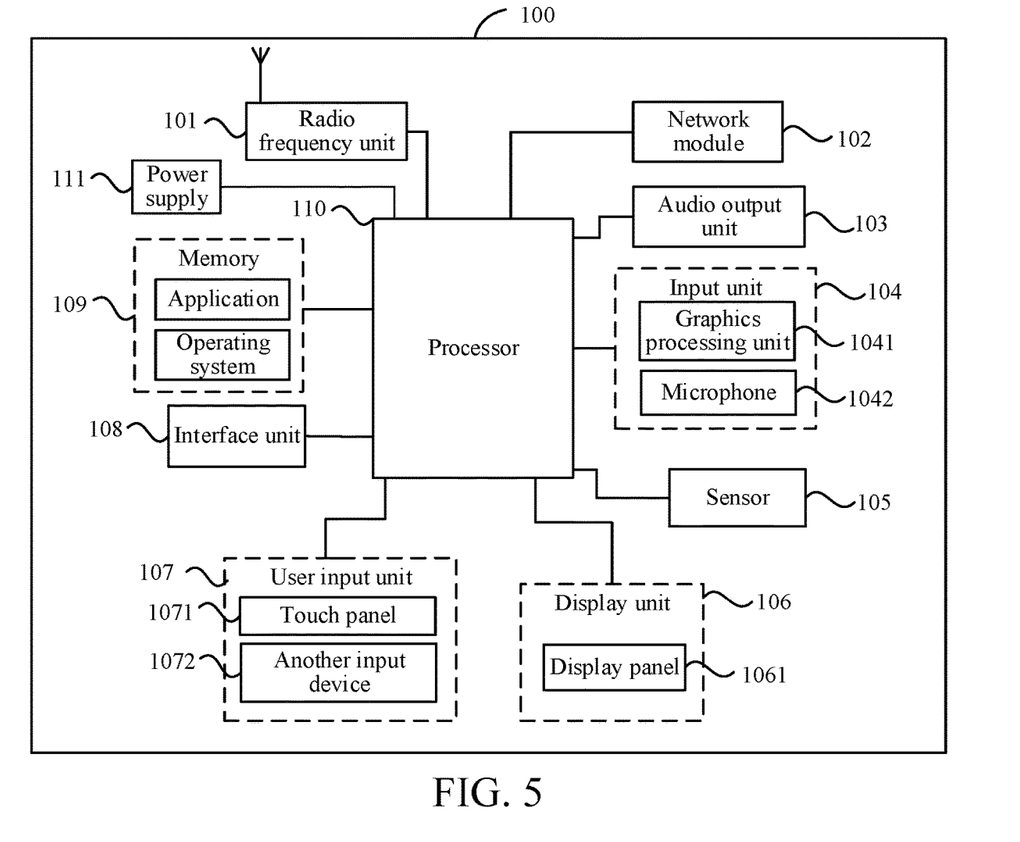
FIG. 5 is a schematic structural diagram of a terminal device according to an embodiment of this disclosure.

FIG. 5 is a schematic diagram of a hardware structure of a terminal device according to the embodiments of this disclosure. The terminal device 100 includes, but is not limited to, components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the terminal device 100 shown in FIG. 5 constitutes no limitation on the terminal device, and the terminal device 100 may include more or fewer components than those shown in the figure, or some components may be combined, or a different component deployment may be used. In the embodiments of this disclosure, the terminal device 100 includes but is not limited to a mobile phone, a tablet computer, a notebook computer, a handheld computer, an in-vehicle terminal device, a wearable device, and a pedometer.

The processor 110 is configured to determine, in a case that a predetermined condition is met, a candidate resource set according to resource information of first resources in a resource selection window; and configured to select a target resource from the candidate resource set, where the predetermined condition includes at least one of the following: the terminal device detects a reserved resource of UE of a first type, or the terminal device is UE of a first type; and the resource information includes at least one of the following: priority information, a measurement result, a measurement threshold, or a UE type of UE to which the first resource belongs.

According to the terminal device provided in the embodiments of this disclosure, in a case that the terminal device detects the reserved resource of the UE of the first type and/or the terminal device is the UE of the first type, the candidate resource set is determined according to the resource information (at least one of the priority information, the measurement result, or the measurement threshold) of the first resources in the resource selection window, and the target resource is selected from the candidate resource set. In this way, when the UE of the first type supports the preemption mechanism or the UE of the first type detects preemption, resource selection or re-selection may be performed based on the resource information of the first resources in the resource selection window, which reduces the probability that the resources of the PUE are preempted, and avoids frequent resource re-selection by the UE of the first type, thereby reducing the energy overhead and performance loss of the UE of the first type, and further achieving power saving.

It should be understood that, in the embodiments of this disclosure, the radio frequency unit 101 may be configured to receive and transmit information or receive and transmit a signal during a call. Alternatively, after downlink data from a base station is received, the downlink data is sent to the processor 110 for processing. In addition, uplink data is sent to the base station. Generally, the radio frequency unit 101 includes, but is not limited to, an antenna, at least one amplifier, a transceiver, a coupler, a low noise amplifier, a duplexer, and the like. In addition, the radio frequency unit

101 may further communicate with another device through a wireless communications system and network.

The terminal device 100 provides the user with wireless broadband Internet access in a network module 102, such as helping the user to send and receive emails, browse web pages, and access streaming media.

The audio output unit 103 may convert audio data received by the radio frequency unit 101 or the network module 102 or stored in the memory 109 into audio signals and output the audio signals as sounds. In addition, the audio output unit 103 may further provide an audio output that is related to a particular function executed by the terminal device 100 (for example, a call signal receiving sound or a message receiving sound). The audio output unit 103 includes a speaker, a buzzer, a receiver, and the like.

The input unit 104 is configured to receive an audio or video signal. The input unit 104 may include a graphics processing unit (Graphics Processing Unit, GPU) 1041 and a microphone 1042. The graphics processing unit 1041 performs processing on image data of a static picture or a video that is obtained by an image acquisition apparatus (for example, a camera) in a video acquisition mode or an image acquisition mode. The processed image frame can be displayed on the display unit 106. An image frame that has been processed by the graphics processing unit 1041 may be stored in the memory 109 (or another storage medium) or sent by using the radio frequency unit 101 or the network module 102. The microphone 1042 can receive sounds and can process such sounds as audio data. The processed audio data may be converted, in a phone call mode, into an output in a format that can sent by the radio frequency unit 101 to a mobile communications base station.

The terminal device 100 may further include at least one sensor 105, such as an optical sensor, a motion sensor, and other sensors. Alternatively, the optical sensor includes an ambient light sensor and a proximity sensor. The ambient light sensor may adjust luminance of the display panel 1061 according to brightness of the ambient light. The proximity sensor may switch off the display panel 1061 and/or backlight when the terminal device 100 is moved to the ear. As one type of motion sensor, an acceleration sensor may detect magnitude of accelerations in various directions (generally in three axes), may detect magnitude and a direction of the gravity when static, and may be configured to identify a terminal device attitude (for example, switchover between horizontal and vertical screens, a related game, and attitude calibration of a magnetometer), a related function of vibration identification (for example, a pedometer and a knock); The sensor 105 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 106 is configured to display information inputted by the user or information provided for the user. The display unit 106 may include a display panel 1061. The display panel 1061 may be configured in the form of a liquid crystal display (LCD), an organic light-emitting diode (OLED), or the like.

The user input unit 107 may be configured to receive input digit or character information, and generate key signal input related to the user setting and function control of the terminal device 100. Alternatively, the user input unit 107 includes a touch panel 1071 and another input device 1072. The touch panel 1071, also referred to as a touchscreen, may collect a touch operation of a user on or near the touch panel (for example, an operation of a user on or near the touch panel 1071 by using any suitable object or attachment, such as a finger or a stylus). The touch panel 1071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 110. Moreover, the touch controller may receive and execute a command transmitted from the processor 110. In addition, the touch panel 1071 may be implemented by using various types, such as a resistive type, a capacitive type, an infrared type, and a surface acoustic wave type. In addition to the touch panel 1071, the user input unit 107 may further include the another input device 1072. Alternatively, the another input device 1072 may include, but is not limited to, a physical keyboard, a functional key (for example, a volume control key or a switch key), a track ball, a mouse, and a joystick, which are not repeated herein.

Further, the touch panel 1071 may cover the display panel 1061. After detecting a touch operation on or near the touch panel, the touch panel 1071 transfers the touch operation to the processor 110, to determine a type of a touch event. Then, the processor 110 provides a corresponding visual output on the display panel 1061 according to the type of the touch event. In FIG. 5, the touch panel 1071 and the display panel 1061 implement, as two independent parts, input and output functions of the terminal device 100. However, in some embodiments, the touch panel 1071 and the display panel 1061 may be integrated to implement the input and output functions of the terminal device 100, which is not Alternatively limited herein.

The interface unit 108 is an interface for connecting an external apparatus to the terminal device 100. For example, the external apparatus may include a wired or wireless headset port, an external power supply (or battery charger) port, a wired or wireless data port, a memory card port, a port for connecting an apparatus with a recognition module, an audio input/output (I/O) port, a video I/O port, a headphone port, and the like. The interface unit 108 may be configured to receive input (for example, data information or power) from an external apparatus and transmit the received input to one or more elements in the terminal device 100 or may be configured to transmit data between the terminal device 100 and the external apparatus.

The memory 109 may be configured to store a software program and various data. The memory 109 may mainly include a program storage area and a data storage area. The program storage area may store an operating system, an application required by at least one function (for example, a sound playback function and an image display function), and the like. The data storage area may store data (for example, audio data and a phone book) created according to use of the mobile phone. In addition, the memory 109 may include a high speed random access memory, and may further include a non-volatile memory, such as at least one magnetic disk storage device, a flash memory device or other non-volatile solid state storage devices.

A processor 110 is the control center of the terminal device 100, and is connected to various parts of the terminal device 100 by using various interfaces and lines. By running or executing the software program and/or module stored in the memory 109, and invoking data stored in the memory 109, the processor performs various functions and data processing of the terminal device 100, thereby performing overall monitoring on the terminal device 100. The processor 110 may include one or more processing units. Optionally, the processor 110 may integrate an application processor and a modem. The application processor mainly processes an operating system, a user interface, an application, and the like. The modem mainly processes wireless communication. It may be understood that the foregoing modem processor may either not be integrated into the processor 110.

The terminal device 100 may further include the power supply 111 (for example, a battery) for supplying power to the components. Optionally, the power supply 111 may be logically connected to the processor 110 by using a power management system, thereby implementing functions such as charging, discharging, and power consumption management by using the power management system.

In addition, the terminal device 100 includes some functional module that are not shown, which are not described herein in detail.

Optionally, an embodiment of this disclosure further provides a terminal device, including a processor, a memory, and a computer program stored in the memory and executable on the processor, where the computer program, when executed by the processor, implements the process of the resource selection method in the foregoing embodiments, and can achieve the same technical effects. To avoid repetition, details are not described herein again.

An embodiment of this disclosure further provides a computer-readable storage medium, storing a computer program, where the computer program, when executed by a processor, implements the processes of the resource selection method in the foregoing embodiments, and can achieve the same technical effects. To avoid repetition, details are not described herein again. The computer-readable storage medium includes a read-only memory (Read-Only Memory, ROM), a random access memory (Random Access Memory, RAM), a magnetic disk, an optical disc, or the like.

It should be noted that, the term "include", "comprise" or any other variation thereof herein is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses.

Through the descriptions of the foregoing implementations, a person skilled in the art may clearly understand that the methods in the foregoing embodiments may be implemented via software and a necessary general hardware platform, and certainly, may also be implemented by hardware, but in many cases, the former manner is a better implementation. Based on such an understanding, the technical solutions of this disclosure essentially or the part contributing to the related art may be implemented in the form of a software product. The computer software product is stored in a storage medium (for example, a read-only memory (ROM)/random access memory (RAM), a magnetic disk, or an optical disc), and includes several instructions for instructing a terminal device (which may be a mobile phone, a computer, a server, a conditioner, a network device, or the like) to perform the method described in the embodiments of this disclosure.

The embodiments of this disclosure are described above with reference to the accompanying drawings. However, this disclosure is not limited to the foregoing specific implementations. The foregoing specific implementations are illustrative instead of limitative. Enlightened by this disclosure, a person of ordinary skill in the art can make many forms without departing from the idea of this disclosure and the scope of protection of the claims. All of the forms fall within the protection of this disclosure.

What is claimed is:

1. A resource selection method, comprising:
   determining, by user equipment (UE) in a case that a predetermined condition is met, a candidate resource set according to resource information of first resources in a resource selection window; and
   selecting, by the UE, a target resource from the candidate resource set, wherein
   the predetermined condition comprises at least one of the following: the UE detects a reserved resource of UE of a first type, or the UE is UE of a first type; and the resource information comprises at least one of the following: priority information, a measurement result, a measurement threshold, or a UE type of UE to which the first resources belong;
   in a case that the UE is the UE of the first type, the method further comprises:
   reporting, by the UE, the candidate resource set in a case that a reporting condition is met,
   wherein the reporting condition is that a ratio of a resource quantity of the candidate resource set to a resource quantity of the resource selection window is greater than or equal to a threshold.

2. The method according to claim 1, wherein in a case that the UE detects the reserved resource of the UE of the first type, the first resources comprise the reserved resource of the UE of the first type.

3. The method according to claim 1, wherein the resource information further comprises enable information, and the enable information is used for indicating whether a partial sensing mechanism of the UE is enabled.

4. The method according to claim 1, wherein the priority information is used for indicating that: the UE of the first type has a highest priority, and/or the reserved resource of the UE of the first type has a highest priority.

5. The method according to claim 1, wherein a priority of the UE of the first type is set according to a first preset rule, wherein
   the first preset rule comprises at least one of the following:
   setting the priority of the UE of the first type to be greater than or equal to a priority of a packet transmitted by the UE,
   setting the priority of the UE of the first type according to a preset priority offset value, or
   the priority of the UE of the first type being within a preset priority range;
   wherein the preset priority offset value is related to a channel busy rate (CBR) of the UE; or
   the preset priority offset value is predefined, or configured by higher layer signaling, or indicated by downlink control information (DCI), or indicated by sidelink control information (SCI); or
   a lower threshold of the preset priority range is predefined, or configured by higher layer signaling, or indicated by DCI, or indicated by SCI.

6. The method according to claim 1, wherein the first resources comprise the reserved resource of the UE of the first type and a reserved resource of UE of a second type; and
   the determining, by UE, a candidate resource set according to resource information of first resources in a resource selection window comprises:
   excluding, by the UE, the reserved resource of the UE of the first type in a case that the priority of the reserved resource of the UE of the first type is the same as a priority of the reserved resource of the UE of the second type.

7. The method according to claim 1, wherein the first resources comprise the reserved resource of the UE of the first type and resources not occupied by the UE of the first type; and
the determining, by UE, a candidate resource set according to resource information of first resources in a resource selection window comprises:
selecting, by the UE according to the resource information, all or some of the resources not occupied by the UE of the first type as candidate resources.

8. The method according to claim 7, wherein the resources not occupied by the UE of the first type comprise a reserved resource of UE of a second type; the resource information further comprises information used for indicating that a first probability is lower than a second probability; and the first probability is a probability that the UE selects the reserved resource of the UE of the first type, and the second probability is a probability that the UE selects the reserved resource of the UE of the second type.

9. The method according to claim 8, wherein a difference between the first probability and the second probability is greater than or equal to a first threshold, wherein the first threshold is specified in a protocol, or configured by a control node, or pre-configured.

10. The method according to claim 1, wherein the measurement result comprises a reference measurement value; and before the determining, by UE, a candidate resource set according to resource information of first resources in a resource selection window, the method further comprises:
configuring, by the UE, a detection parameter of the UE of the first type, wherein the detection parameter comprises at least one of the following: a second preset rule of a target measurement threshold, a third preset rule of a reference measurement value, a measurement threshold offset value, or a measurement offset value.

11. The method according to claim 10, wherein in a case that any first resource is the reserved resource of the UE of the first type, the second preset rule comprises: obtaining the target measurement threshold based on a first original measurement threshold and a first measurement threshold offset value; or
in a case that the UE is the UE of the first type, the second preset rule comprises: setting the target measurement threshold based on a second original measurement threshold and a second measurement threshold offset value.

12. The method according to claim 11, wherein the first measurement threshold offset value is predefined, or specified in a protocol, or pre-configured, or configured by a first carrier, or indicated by first indication information; and/or the first measurement threshold offset value is related to a channel busy rate (CBR) of the UE, wherein
the first carrier comprises radio resource control (RRC) or a Media Access Control (MAC) control element (CE); and the first indication information comprises downlink control information (DCI) or sidelink control information (SCI).

13. The method according to claim 11, wherein the second measurement threshold offset value is predefined, or specified in a protocol, or pre-configured, or configured by a second carrier, or indicated by second indication information; and/or the second measurement threshold offset value is related to a channel busy rate (CBR) of the UE, wherein
the second carrier comprises radio resource control (RRC) or a Media Access Control (MAC) control element (CE); and the second indication information comprises downlink control information (DCI) or sidelink control information (SCI).

14. The method according to claim 10, wherein in a case that any first resource is the reserved resource of the UE of the first type, the third preset rule comprises: obtaining a reference measurement value corresponding to the reserved resource of the UE of the first type based on a measurement value corresponding to the reserved resource of the UE of the first type and a first measurement offset value; or
in a case that the UE is the UE of the first type, the third preset rule comprises: obtaining, based on a measurement value corresponding to any first resource and a second measurement offset value, a reference measurement value corresponding to the any first resource.

15. The method according to claim 14, wherein the first measurement offset value is predefined, or specified in a protocol, or pre-configured, or configured by a third carrier, or indicated by third indication information; and/or the first measurement offset value is related to a channel busy rate (CBR) of the UE, wherein
the third carrier comprises radio resource control (RRC) or a Media Access Control (MAC) control element (CE); and the third indication information comprises downlink control information (DCI) or sidelink control information (SCI).

16. The method according to claim 14, wherein the second measurement offset value is predefined, or specified in a protocol, or pre-configured, or configured by a fourth carrier, or indicated by fourth indication information; and/or the second measurement offset value is related to a channel busy rate (CBR) of the UE, wherein
the fourth carrier comprises radio resource control (RRC) or a Media Access Control (MAC) control element (CE); and the fourth indication information comprises downlink control information (DCI) or sidelink control information (SCI).

17. The method according to claim 1, further comprising:
receiving, by the UE, target signaling, wherein
the target signaling comprises downlink control information (DCI), or sidelink control information (SCI), or high-level configuration signaling; and the target signaling is used for indicating that the UE is the UE of the first type or the first resources comprise the reserved resource of the UE of the first type,
wherein the determining, by UE, a candidate resource set according to resource information of first resources in a resource selection window comprises:
determining, by the UE, the candidate resource set according to target information and the resource information of the first resources in the resource selection window, wherein
the target information is used for indicating that the UE performs resource selection and/or enabling, or whether the UE supports a preemption mechanism; and the target information is carried in at least one of the following: radio resource control (RRC), downlink control information (DCI), sidelink control information (SCI), or configuration information of a resource pool.

18. UE, comprising:
a processor; and
a memory storing a computer program that is executable on the processor, wherein the computer program, when executed by the processor, causes the UE to:

determine, in a case that a predetermined condition is met, a candidate resource set according to resource information of first resources in a resource selection window; and select a target resource from the candidate resource set, wherein the predetermined condition comprises at least one of the following: the UE detects a reserved resource of UE of a first type, or the UE is UE of a first type; and the resource information comprises at least one of the following: priority information, a measurement result, a measurement threshold, or a UE type of UE to which the first resources belong;

in a case that the UE is the UE of the first type, the computer program, when executed by the processor, causes the UE to further perform the following step:

reporting, by the UE, the candidate resource set in a case that a reporting condition is met, wherein the reporting condition is that a ratio of a resource quantity of the candidate resource set to a resource quantity of the resource selection window is greater than or equal to a threshold.

19. A non-transitory computer-readable storage medium storing a computer program, wherein the computer program, when executed by a processor, performs the following steps:

determining, by user equipment (UE) in a case that a predetermined condition is met, a candidate resource set according to resource information of first resources in a resource selection window; and selecting, by the UE, a target resource from the candidate resource set, wherein the predetermined condition comprises at least one of the following: the UE detects a reserved resource of UE of a first type, or the UE is UE of a first type; and the resource information comprises at least one of the following: priority information, a measurement result, a measurement threshold, or a UE type of UE to which the first resources belong;

in a case that the UE is the UE of the first type, the computer program, when executed by the processor, causes the UE to further perform the following step:

reporting, by the UE, the candidate resource set in a case that a reporting condition is met, wherein the reporting condition is that a ratio of a resource quantity of the candidate resource set to a resource quantity of the resource selection window is greater than or equal to a threshold.

\* \* \* \* \*